(12) United States Patent
Kang et al.

(10) Patent No.: US 8,699,173 B1
(45) Date of Patent: Apr. 15, 2014

(54) DISK DRIVE DETECTING TOUCHDOWN EVENT BY EVALUATING FREQUENCY RESPONSE OF A TOUCHDOWN METRIC

(75) Inventors: Soo-Choon Kang, Irvine, CA (US); Hongchao T. Zhao, San Jose, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 284 days.

(21) Appl. No.: 13/224,118

(22) Filed: Sep. 1, 2011

(51) Int. Cl.
*G11B 21/02* (2006.01)

(52) U.S. Cl.
USPC .............................................. 360/75

(58) Field of Classification Search
None
See application file for complete search history.

(56) References Cited

U.S. PATENT DOCUMENTS

| | | | | |
|---|---|---|---|---|
| 5,168,413 A | * | 12/1992 | Coker et al. | 360/137 |
| 5,594,595 A | * | 1/1997 | Zhu | 360/31 |
| 5,784,296 A | * | 7/1998 | Baker et al. | 702/76 |
| 5,903,857 A | * | 5/1999 | Behrens et al. | 702/190 |
| 6,611,396 B1 | * | 8/2003 | Kermiche et al. | 360/77.04 |
| 6,950,266 B1 | * | 9/2005 | McCaslin et al. | 360/75 |
| 7,158,325 B1 | * | 1/2007 | Hu et al. | 360/69 |
| 7,583,466 B2 | | 9/2009 | Kermiche et al. | |
| 8,077,423 B1 | * | 12/2011 | Rahgozar | 360/75 |
| 8,089,719 B1 | * | 1/2012 | Dakroub | 360/75 |
| 8,139,310 B1 | * | 3/2012 | Hogg | 360/75 |
| 8,144,419 B1 | * | 3/2012 | Liu | 360/75 |
| 2002/0071196 A1 | * | 6/2002 | Chapin et al. | 360/75 |
| 2006/0203376 A1 | * | 9/2006 | Yoshioka et al. | 360/75 |
| 2008/0037153 A1 | * | 2/2008 | Yoshizawa | 360/31 |
| 2009/0257145 A1 | | 10/2009 | Tsuyama | |
| 2009/0268330 A1 | * | 10/2009 | Lee et al. | 360/31 |
| 2010/0321834 A1 | * | 12/2010 | Hanyu | 360/246.2 |

* cited by examiner

*Primary Examiner* — Peter Vincent Agustin

(57) ABSTRACT

A disk drive is disclosed comprising a head actuated over a disk, and a fly height actuator operable to control a fly height of the head over the disk. A periodic control signal is applied to the fly height actuator, a frequency response of a touchdown metric at a frequency of the periodic control signal is measured, and a touchdown event is detected in response to the frequency response of the touchdown metric.

30 Claims, 5 Drawing Sheets

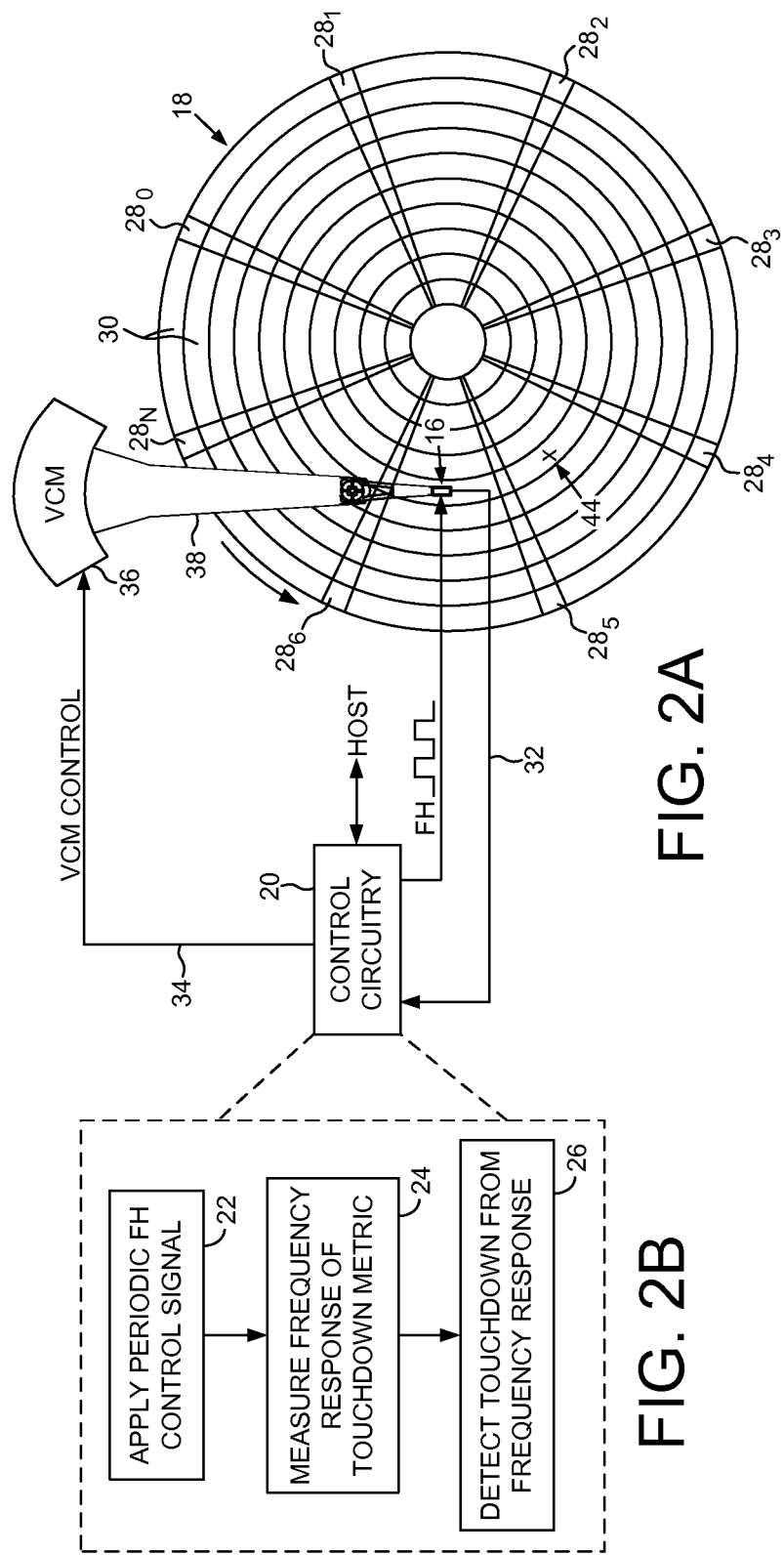

DISK DRIVE DETECTING TOUCHDOWN EVENT BY EVALUATING FREQUENCY RESPONSE OF A TOUCHDOWN METRIC

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It may be desirable to calibrate the fly height actuator by performing a touchdown procedure wherein the fly height of the head is decreased until touchdown is detected. An operating fly height control signal may be selected relative to the control signal that causes the head to touchdown on the disk. In addition, it may be desirable to detect a contaminant on the disk or a contaminant on the head that may cause a touchdown event during the touchdown calibration procedure.

BRIEF DESCRIPTION OF THE DRAWINGS

FIG. 2A shows a disk drive according to an embodiment of the present invention comprising a head actuated over a disk, wherein the head comprises a fly height actuator.

FIG. 2B is a flow diagram according to an embodiment of the present invention wherein a periodic fly height control signal is applied to the fly height actuator and a frequency response of a touchdown metric measured to detect a touchdown event.

DETAILED DESCRIPTION OF EMBODIMENTS OF THE INVENTION

FIG. 2A shows a disk drive according to an embodiment of the present invention comprising a head 16 actuated over a disk 18, and a fly height actuator operable to control a fly height of the head 16 over the disk 18. The disk drive further comprises control circuitry 20 operable to execute the flow diagram of FIG. 2B, wherein a periodic control signal is applied to the fly height actuator (step 22), a frequency response of a touchdown metric at a frequency of the periodic control signal is measured (step 24), and a touchdown event is detected in response to the frequency response of the touchdown metric (step 26).

Figure 1:
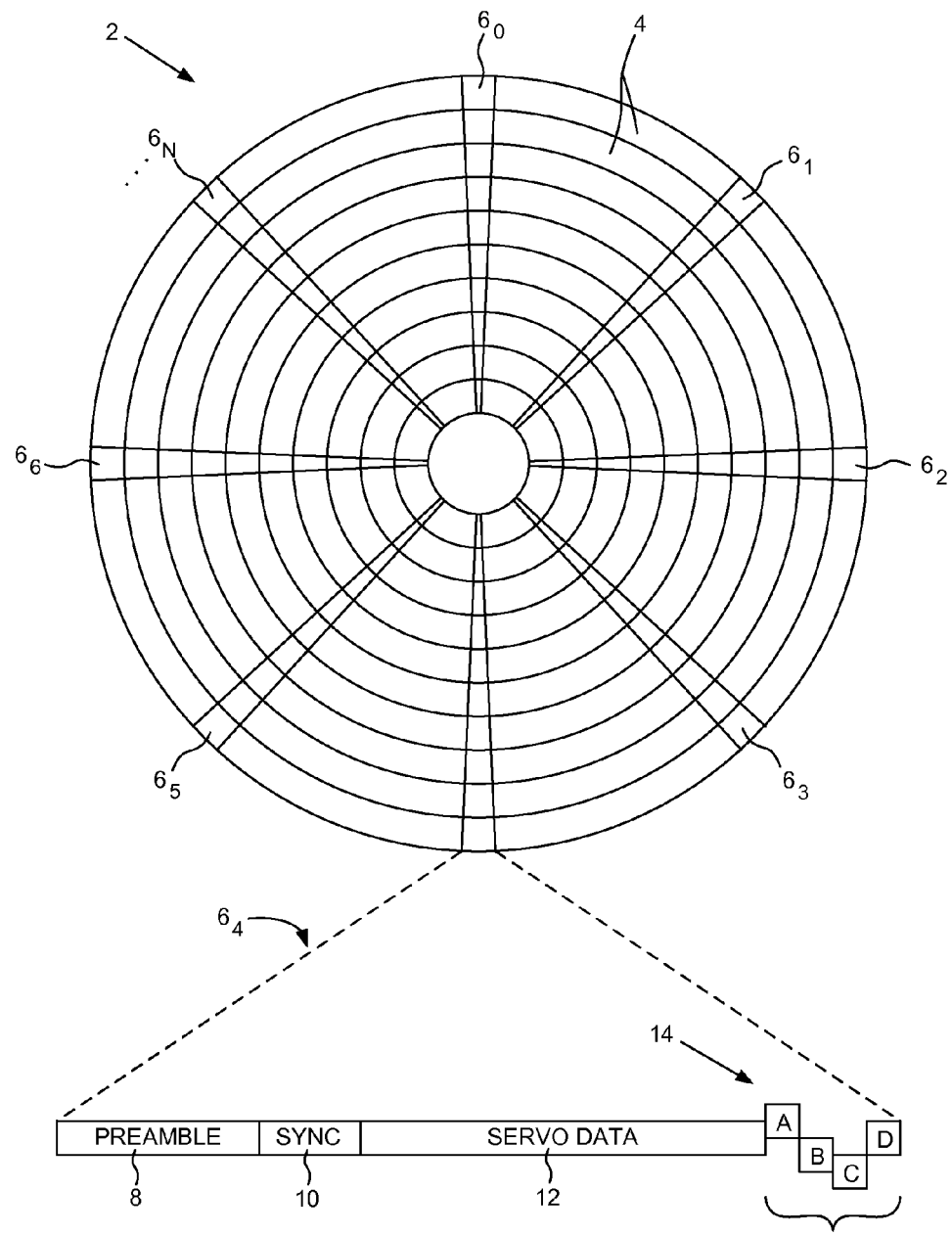
FIG. 1 shows a prior art disk format comprising a plurality of servo tracks defined by embedded servo sectors.

In the embodiment of FIG. 2A, the disk 18 comprises embedded servo sectors $28_0$-$28_N$ that define a plurality of servo tracks 30. The control circuitry 20 processes a read signal 32 emanating from the head 16 to demodulate the servo sectors $28_0$-$28_N$ and generate a position error signal (PES) representing an error between the actual position of the head and a target position relative to a target track. The control circuitry 20 filters the PES using a suitable compensation filter to generate a control signal 34 applied to a voice coil motor (VCM) 36 which rotates an actuator arm 38 about a pivot in order to actuate the head 16 radially over the disk in a direction that reduces the PES. The servo sectors $28_0$-$28_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

Any suitable fly height actuator may be employed in the embodiments of the present invention. In one embodiment, the fly height actuator may comprise a heater integrated into the head 16, wherein the head 16 thermally expands toward the disk 18 when the heater is energized (e.g., with a driving current). In another embodiment, the fly height actuator may comprise a piezoelectric (PZT) actuator integrated into the head which deflects toward the disk when energized (e.g., with a driving voltage).

The periodic control signal applied to the fly height actuator may comprise any suitable magnitude and frequency. In one embodiment, the control circuitry 20 generates the periodic control signal by periodically decreasing the fly height for at least one revolution of the disk and increasing the fly height for at least one revolution of the disk. In an embodiment illustrated in FIG. 3A, the control circuitry 20 decreases the fly height of the head for two disk revolutions, and increases the fly height of the head for two disk revolutions.

In one embodiment, the control circuitry 20 detects the touchdown event in response to the frequency response of the touchdown metric by evaluating a phase response of the touchdown metric at the frequency of the periodic control signal. The phase response of the touchdown metric may be evaluated in any suitable manner, such as by computing a discrete Fourier transform (DFT) of the touchdown metric. In one embodiment, the control circuitry 20 computes a real part and an imaginary part of the touchdown metric at the frequency of the periodic control signal in order to evaluate the phase response.

Figure 3A:
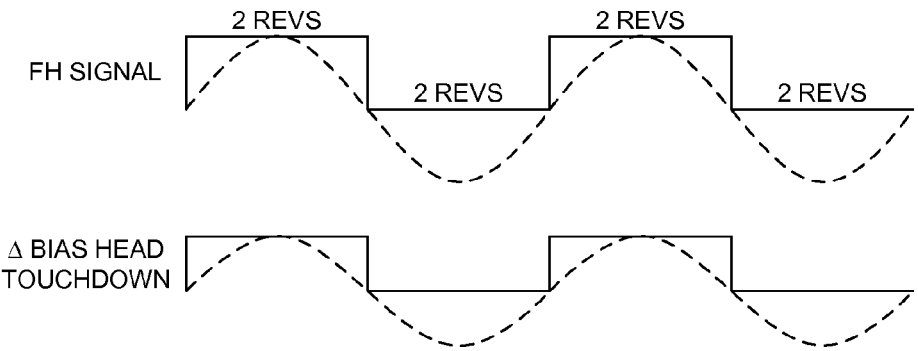
FIG. 3A shows an embodiment of the present invention wherein the touchdown metric comprises a bias force applied to the actuator arm, and the touchdown event occurs when the head contacts the disk surface.
Figure 3B:
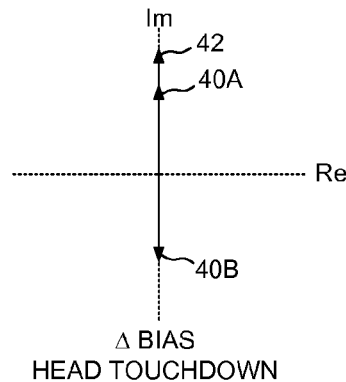
FIG. 3B illustrates an embodiment of the present invention wherein the head touching down on the disk is detected when the touchdown metric is one of approximately in phase with the periodic control signal or approximately 180 degrees out of phase with the periodic control signal.

Any suitable touchdown metric may be measured in the embodiments of the present invention. In one embodiment, the touchdown metric comprises a bias force applied to the actuator arm 38. FIGS. 3A and 3B illustrate an embodiment wherein the control circuitry 20 detects the head 16 touching down on the disk 18 when the touchdown metric (change in bias force) is one of approximately in phase with the periodic control signal or approximately 180 degrees out of phase with the periodic control signal. In this embodiment, the periodic control signal comprises a square wave (solid line) having a fundamental frequency represented as a sine wave (dotted line). When the periodic control signal is increased (square wave transitions to high state), and the head is flying very near the disk surface, the head contacts the disk almost immediately. The phase of the touchdown metric (change in bias force) 40A is therefore in phase with the periodic control signal 42 as illustrated in FIG. 3B when the head is near a first diameter of the disk (e.g., outer diameter), or the phase of the touchdown metric 40B is 180 degrees out of phase with the periodic control signal 42 as illustrated in FIG. 3B when the head is near a second diameter of the disk (e.g., inner diameter). That is, the bias force disturbance due to the head contacting the disk will either be additive or subtractive from the measured bias force depending on the radial location of the head when it contacts the disk due to the rotational torque of the suspension on the actuator arm.

Figure 4A:
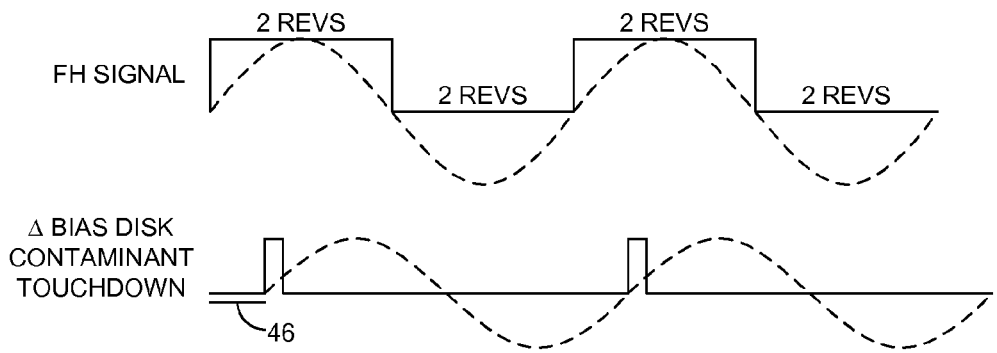
FIG. 4A shows an embodiment of the present invention wherein the touchdown metric comprises a bias force applied to the actuator arm, and the touchdown event occurs when the head contacts a contaminant on the disk.
Figure 4B:
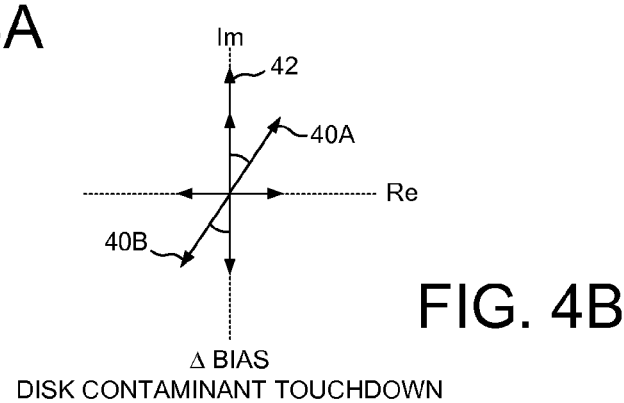
FIG. 4B illustrates an embodiment of the present invention wherein the head contacting a contaminant on the disk is detected when the touchdown metric is out of phase with the periodic control signal by a degree corresponding to a rotational delay of the disk after decreasing the fly height of the head until the head contacts the contaminant.

In the embodiment illustrated in FIG. 2A, there may be a contaminant 44 on the surface of the disk such that when the periodic control signal is increased (square wave transitions to high state), the fly height of the head 16 decreasing may cause the head 16 to contact the contaminant 44. However, the head 16 will not contact the contaminant 44 until the disk 18 rotates up to a full revolution depending on the circumferential location of the contaminant 44. This rotational delay manifests as a phase shift 46 in the touchdown metric (change in bias force) relative to the periodic control signal as illustrated in FIGS. 4A and 4B. In the embodiment of FIG. 4A, the periodic control signal has a period of four disk revolutions, therefore the phase shift of the touchdown metric may range from zero to ninety degrees (zero to a full disk revolution). The quadrant where the phase shift occurs (e.g., $1^{st}$ or $3^{rd}$ quadrant in the example of FIG. 4B) depends on which side of the slider the contaminant contacts and the resulting rotational direction and corresponding torque the suspension has on the actuator arm.

Figure 5A:
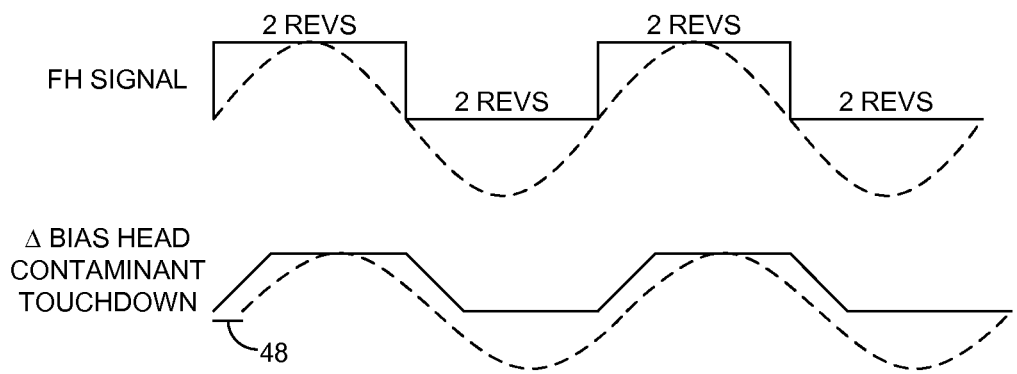
FIG. 5A shows an embodiment of the present invention wherein the touchdown metric comprises a bias force applied to the actuator arm, and the touchdown event occurs when a contaminant on the head contacts the disk.
Figure 5B:
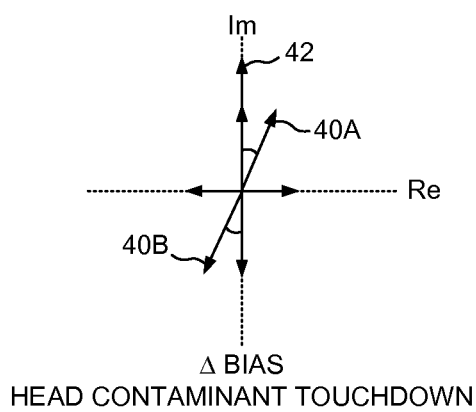
FIG. 5B illustrates an embodiment of the present invention wherein a contaminant on the head contacting the disk is detected when the touchdown metric is out of phase with the periodic control signal.

In another embodiment, there may be a contaminant on the head 16 that may contact the disk 18 when the periodic control signal is increased (square wave transitions to high state). When the head 16 comprises the contaminant (rather than the disk 18), there has been observed a corresponding phase shift in the measured bias metric (change in bias force). The cause of the phase shift is unclear, but may be due to the location of the contaminant on the slider of the head relative to the location of the read element. That is, the distance of the contaminant on the head from the read element may cause the phase shift in the touchdown metric. Another possibility is the textured surface of the contaminant (as compared to the normal touchdown surface of the head) may cause the phase shift. That is, the normal touchdown surface of the head 16 may be relatively smooth and even such that the touchdown event causes an almost immediate change in the touchdown metric (change in bias force), whereas a contaminant on the head may have a textured surface that causes a ramping change in the bias force as the head presses down onto the disk and lifts off the disk. This is illustrated in the example of FIGS. 5A and 5B which shows how a ramping change in the bias force due to a contaminant on the head could cause a phase shift 48 in the touchdown metric. The quadrant where the phase shift occurs (e.g., $1^{st}$ or $3^{rd}$ quadrant in the example of FIG. 4B) depends on which side of the slider the contaminant manifests and the resulting rotational direction and corresponding torque the suspension has on the actuator arm.

Figure 6A:
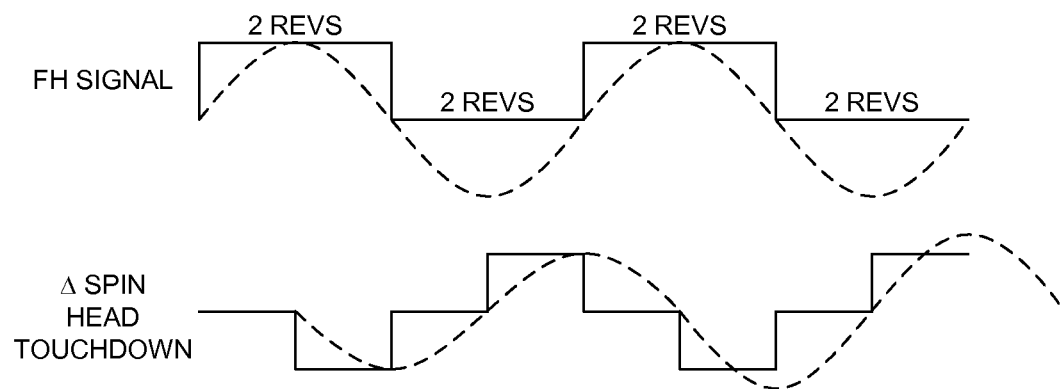
FIG. 6A shows an embodiment of the present invention wherein the touchdown metric comprises a spin rate of the disk, and the touchdown event occurs when the head contacts the disk surface.
Figure 6B:
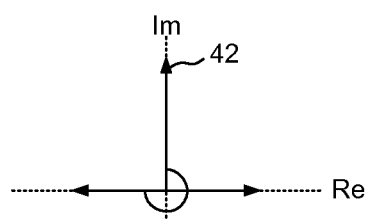
FIG. 6B illustrates an embodiment of the present invention wherein the head touching down on the disk is detected when the touchdown metric is out of phase with the periodic control signal by approximately a first phase.

In another embodiment of the present invention, the disk drive comprises a spindle motor for spinning the disk at a target speed, and the touchdown metric comprises a spin rate of the disk 18. That is, when there is a touchdown event the resulting friction will cause the spin rate of the disk 18 to decrease. In one embodiment, the spindle motor servo system samples the spin rate of the disk once per revolution, therefore the friction of a head touchdown event is an energy response resulting in a phase delay of either 90 degrees or 270 degrees depending on the polarity of the measured change in spin rate. This embodiment is illustrated in FIGS. 6A and 6B wherein in FIG. 6A the touchdown metric (change in spin rate) is phase shifted by 270 degrees relative to the periodic control signal. If the change in spin rate is measured with an opposite polarity, the resulting phase shift of the touchdown metric would be 90 degrees as illustrated in FIG. 6B.

Figure 7:
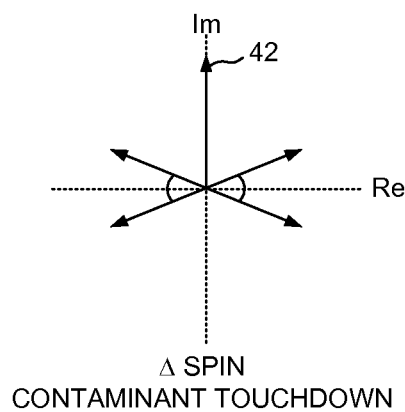
FIG. 7 illustrates an embodiment of the present invention wherein the head contacting a contaminant on the disk or a contaminant on the head contacting the disk is detected when the touchdown metric is out of phase with the periodic control signal by a second phase different from the first phase.

When the touchdown metric is the change in spin rate and the touchdown event is due to a contaminant either on the disk or on the head, a phase shift in the touchdown metric has been observed that is different from the phase shift caused by a true head touchdown event. For example, a contaminant touchdown event has been measured with a phase shift of approximately 180 degrees relative to a true head touchdown event as illustrated in FIG. 7.

In one embodiment, the control circuitry may evaluate multiple touchdown metrics, such as the above described change in bias force and change in spin rate, while incrementally increasing the amplitude of the periodic control signal applied to the fly height actuator until a touchdown event is detected. For example, the control circuitry may incrementally increase the amplitude of the periodic control signal until the frequency response of one of the touchdown metrics exceeds a threshold. In one embodiment, a touchdown event may be detected when one of the real or imaginary parts of each touchdown metric exceeds a respective threshold as described above.

Evaluating the frequency response of a touchdown metric provides the ability to discriminate between a true touchdown event caused by the head contacting the disk, and a contaminant touchdown event caused by the head contacting a contaminant on the disk or caused by a contaminant on the head contacting the disk. Discriminating between a true head touchdown event and a contaminant touchdown event may improve a fly height calibration procedure that attempts to select an optimal fly height control signal used during normal write/read operations. In addition, detecting contaminant touchdown events may help identify and map out defects on the disk and/or help identify defective heads.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk;
a fly height actuator operable to control a fly height of the head over the disk; and
control circuitry operable to:
apply a periodic control signal to the fly height actuator;
measure a frequency response of a touchdown metric at a frequency of the periodic control signal; and
detect a touchdown event in response to the frequency response of the touchdown metric.

2. The disk drive as recited in claim 1, wherein the control circuitry is further operable to generate the periodic control signal by periodically decreasing the fly height for at least one revolution of the disk and increasing the fly height for at least one revolution of the disk.

3. The disk drive as recited in claim 1, wherein the control circuitry is further operable to detect the touchdown event in response to the frequency response of the touchdown metric by evaluating a phase response of the touchdown metric at the frequency of the periodic control signal.

4. The disk drive as recited in claim 1, wherein:
the head is coupled to a distal end of an actuator arm; and
the touchdown metric comprises a bias force applied to the actuator arm.

5. The disk drive as recited in claim 4, wherein the control circuitry is further operable to detect the head touching down on the disk when the touchdown metric is one of approximately in phase with the periodic control signal and approximately 180 degrees out of phase with the periodic control signal.

6. The disk drive as recited in claim 4, wherein the control circuitry is further operable to detect the head contacting a contaminant on the disk when the touchdown metric is out of phase with the periodic control signal by a degree corresponding to a rotational delay of the disk after decreasing the fly height of the head until the head contacts the contaminant.

7. The disk drive as recited in claim 4, wherein the control circuitry is further operable to detect a contaminant on the head contacting the disk when the touchdown metric is out of phase with the periodic control signal.

8. The disk drive as recited in claim 1, wherein the touchdown metric comprises a spin rate of the disk.

9. The disk drive as recited in claim 8, wherein the control circuitry is further operable to detect the head touching down on the disk when the touchdown metric is out of phase with the periodic control signal by approximately a first phase.

10. The disk drive as recited in claim 9, wherein the first phase comprises one of 90 degrees and 270 degrees.

11. The disk drive as recited in claim 9, wherein the control circuitry is further operable to detect the head contacting a contaminant on the disk when the touchdown metric is out of phase with the periodic control signal by a second phase different from the first phase.

12. The disk drive as recited in claim 11, wherein the second phase differs from the first phase by approximately 180 degrees.

13. The disk drive as recited in claim 9, wherein the control circuitry is further operable to detect a contaminant on the head contacting the disk when the touchdown metric is out of phase with the periodic control signal by approximately a second phase different from the first phase.

14. The disk drive as recited in claim 13, wherein the second phase differs from the first phase by approximately 180 degrees.

15. The disk drive as recited in claim 1, wherein the control circuitry is further operable to:
compute a real part and an imaginary part of the touchdown metric at the frequency of the periodic control signal; and
detect the touchdown event in response to the real part and the imaginary part of the touchdown metric.

16. A method of operating a disk drive, the disk drive comprising a disk, a head actuated over the disk, and a fly height actuator operable to control a fly height of the head over the disk, the method comprising:
applying a periodic control signal to the fly height actuator;
measuring a frequency response of a touchdown metric at a frequency of the periodic control signal; and
detecting a touchdown event in response to the frequency response of the touchdown metric.

17. The method as recited in claim 16, further comprising generating the periodic control signal by periodically decreasing the fly height for at least one revolution of the disk and increasing the fly height for at least one revolution of the disk.

18. The method as recited in claim 16, further comprising detecting the touchdown event in response to the frequency response of the touchdown metric by evaluating a phase response of the touchdown metric at the frequency of the periodic control signal.

19. The method as recited in claim 16, wherein:
the head is coupled to a distal end of an actuator arm; and
the touchdown metric comprises a bias force applied to the actuator arm.

20. The method as recited in claim 19, further comprising detecting the head touching down on the disk when the touchdown metric is one of approximately in phase with the periodic control signal and approximately 180 degrees out of phase with the periodic control signal.

21. The method as recited in claim 19, further comprising detecting the head contacting a contaminant on the disk when the touchdown metric is out of phase with the periodic control signal by a degree corresponding to a rotational delay of the disk after decreasing the fly height of the head until the head contacts the contaminant.

22. The method as recited in claim 19, further comprising detecting a contaminant on the head contacting the disk when the touchdown metric is out of phase with the periodic control signal.

23. The method as recited in claim 16, wherein the touchdown metric comprises a spin rate of the disk.

24. The method as recited in claim 23, further comprising detecting the head touching down on the disk when the touchdown metric is out of phase with the periodic control signal by approximately a first phase.

25. The method as recited in claim 24, wherein the first phase comprises one of 90 degrees and 270 degrees.

26. The method as recited in claim 24, further comprising detecting the head contacting a contaminant on the disk when the touchdown metric is out of phase with the periodic control signal by a second phase different from the first phase.

27. The method as recited in claim 26, wherein the second phase differs from the first phase by approximately 180 degrees.

28. The method as recited in claim 24, further comprising detecting a contaminant on the head contacting the disk when the touchdown metric is out of phase with the periodic control signal by approximately a second phase different from the first phase.

29. The method as recited in claim 28, wherein the second phase differs from the first phase by approximately 180 degrees.

30. The method as recited in claim 16, further comprising:
computing a real part and an imaginary part of the touchdown metric at the frequency of the periodic control signal; and
detecting the touchdown event in response to the real part and the imaginary part of the touchdown metric.

* * * * *